United States Patent
Amann et al.

(10) Patent No.: US 9,956,944 B2
(45) Date of Patent: May 1, 2018

(54) PRESSURE CONTROL VALVE WITH INTEGRATED PRESSURE COMPENSATION FUNCTION AND CHECK VALVE FUNCTION

(71) Applicant: KNORR-BREMSE SYSTEME FÜR SCHIENENFAHRZEUGE GMBH, Munich (DE)

(72) Inventors: Klaus Amann, Unterföhring (DE); Thomas Garten, Pulsnitz (DE)

(73) Assignee: KNORR-BREMSE SYSTEME FÜR SCHIENENFAHRZEUGE GMBH (DE)

( * ) Notice: Subject to any disclaimer, the term of this patent is extended or adjusted under 35 U.S.C. 154(b) by 145 days.

(21) Appl. No.: 14/426,067

(22) PCT Filed: Sep. 9, 2013

(86) PCT No.: PCT/EP2013/068554
§ 371 (c)(1),
(2) Date: Mar. 4, 2015

(87) PCT Pub. No.: WO2014/040933
PCT Pub. Date: Mar. 20, 2014

(65) Prior Publication Data
US 2015/0224973 A1    Aug. 13, 2015

(30) Foreign Application Priority Data
Sep. 12, 2012    (DE) .......................... 10 2012 108 538

(51) Int. Cl.
*B60T 8/32*    (2006.01)
*B60T 15/18*    (2006.01)
(Continued)

(52) U.S. Cl.
CPC .......... *B60T 15/184* (2013.01); *B60T 15/021* (2013.01); *B60T 15/20* (2013.01)

(58) Field of Classification Search
CPC ....... B60T 15/021; B60T 15/20; B60T 15/184
See application file for complete search history.

(56) References Cited

U.S. PATENT DOCUMENTS 2,645,239 A * 7/1953 Horn ....................... B60T 15/20
137/87.03
2,721,104 A * 10/1955 McClure ............... B60T 15/184
303/60
(Continued)

FOREIGN PATENT DOCUMENTS

AT    326727 B    12/1975
CN    85107990 A    8/1987
(Continued)

OTHER PUBLICATIONS

English Translation of International Preliminary Report for International Patent Application No. PCT/EP2013/068554 dated Sep. 9, 2013.
(Continued)

*Primary Examiner* — Melody M Burch
(74) *Attorney, Agent, or Firm* — Barnes & Thornburg LLP

(57) ABSTRACT

A pneumatic pressure control valve for a brake control system of a rail vehicle having at least three pressure chambers supplied with compressed air and are disposed in a housing of the pressure control valve, a first pressure chamber sealed by a piston and by a valve seat arranged on a tappet, subjected to a braking pressure and fluidically connected to a second pressure chamber via a conduit in the tappet to relieve pressure, a further third pressure chamber supplied with a supply pressure, arranged between the two pressure chambers and the sealing between the third pressure chamber and the second pressure chamber is achieved by a flat membrane arranged in the third pressure chamber and which enables the tappet to be axially displaced, the flat
(Continued)

membrane has a circular opening arranged substantially centrally to provide a check function and through which the tappet extends in the axial direction.

15 Claims, 2 Drawing Sheets

(51) Int. Cl.
  *B60T 15/20* (2006.01)
  *B60T 15/02* (2006.01)
  *F16F 9/34* (2006.01)

(56) References Cited

U.S. PATENT DOCUMENTS

| | | | | |
|---|---|---|---|---|
| 2,871,064 | A | * | 1/1959 | Price .................. B60T 15/20 303/31 |
| 2,883,997 | A | * | 4/1959 | Schultz ................ B60T 13/40 123/41.69 |
| 3,285,674 | A | * | 11/1966 | Eaton .................. B60T 8/1825 137/495 |
| 3,556,613 | A | | 1/1971 | Keller |
| 3,691,268 | A | * | 9/1972 | Burkley ............. B29C 33/3857 264/162 |
| 3,882,723 | A | | 5/1975 | Wickham |
| 4,397,271 | A | * | 8/1983 | Gardner ................ F01L 1/25 123/90.55 |
| 4,526,041 | A | * | 7/1985 | Beller ................ G01F 1/383 73/702 |
| 4,715,334 | A | * | 12/1987 | Buente ................ F01L 1/25 123/90.55 |
| 4,919,168 | A | * | 4/1990 | Wagner ................ B60T 8/36 137/627.5 |
| 5,190,359 | A | | 3/1993 | Egerton |
| 5,377,524 | A | | 1/1995 | Wise et al. |
| 2006/0055093 | A1 | * | 3/2006 | Cotter ................ F16F 9/585 267/64.11 |

FOREIGN PATENT DOCUMENTS

| | | |
|---|---|---|
| CN | 2245014 Y | 1/1997 |
| CN | 201530374 U | 7/2010 |
| DE | 2702855 B1 | 5/1978 |
| DE | 102011087511 A1 | 6/2012 |
| GB | 1355659 | 6/1974 |

OTHER PUBLICATIONS

English Translation of Written Opinion of the International Search Authority for International Patent Application No. PCT/EP2013/068554 dated Sep. 9, 2013.

Chinese Office Action for Chinese Application No. 201380059181.9, dated Jul. 6, 2016.

Search Report for German Patent Application No. 10 2012 108 538.2; dated Jan. 3, 2013.

Search Report for International Patent Application No. PCT/EP2013/068554; dated Nov. 15, 2013.

* cited by examiner

PRESSURE CONTROL VALVE WITH INTEGRATED PRESSURE COMPENSATION FUNCTION AND CHECK VALVE FUNCTION

PRIORITY CLAIM

This patent application is a U.S. National Phase of International Patent Application No. PCT/EP2013/068554, filed 9 Sep. 2013, which claims priority to German Patent Application No. 10 2012 108 538.2, filed 12 Sep. 2012, the disclosures of which are incorporated herein by reference in their entirety.

FIELD

Disclosed embodiments relate to a pneumatic pressure-regulating valve for a brake control system of a rail vehicle, comprising at least three pressure chambers admitting compressed air and formed in a housing of the pressure-regulating valve, wherein a first pressure chamber, sealed off by a piston and a valve seat arranged on a valve tappet, has a brake pressure admitted to it and has a fluid connection by way of a passage in the valve tappet to a second pressure chamber to relieve pressure, wherein a third pressure chamber, to which a supply pressure is admitted, is furthermore arranged between the two pressure chambers and the sealing between the third pressure chamber and the second pressure chamber is provided by means of a flat diaphragm, which is arranged in the third pressure chamber and which allows an axial movement of the valve tappet. The disclosed embodiments further relate to a pneumatic control valve for brake control systems for rail vehicles comprising such a pneumatic pressure-regulating valve.

The sphere of application of the disclosed embodiments is rail vehicle construction.

Rail vehicles may be equipped with a pneumatic control valve to control the filling of air supply reservoirs and to form a corresponding brake cylinder or pilot pressure as a function of the pressure in the main air line. In such pneumatic control valves pneumatic pressure-regulating valves may furthermore be used as maximum pressure limiters or pressure-reducing valves. Pressure-reducing valves prevent over-braking and compensate for air losses dues to leakages. The high pressure limiter limits the maximum brake cylinder pressure irrespective of other influencing variables and the pressure-regulating valve ensures that, irrespective of the pressure on the inlet side, a specific pressure prevailing on the outlet side is not exceeded.

BRIEF DESCRIPTION OF THE DRAWINGS

The invention will now be explained in more detail with reference to the accompanying figures, of which.

DETAILED DESCRIPTION OF THE DISCLOSED EMBODIMENTS

Figure 1:
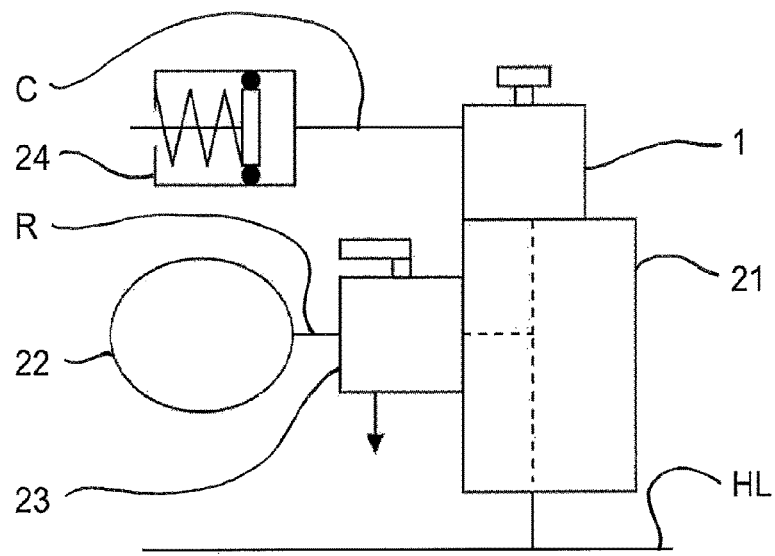
FIG. 1 shows a simplified block diagram of a brake control system for rail vehicles, comprising a pneumatic control valve having a pneumatic pressure-regulating valve.

The disclosed embodiments improve the pneumatic pressure-regulating valve of the generic type so that the pneumatic pressure-regulating valve has both an integrated pressure compensation function and an integrated check valve function.

According to the disclosed embodiments the flat diaphragm comprises a substantially centrally arranged circular opening for achieving a check function, through which the valve tappet extends in an axial direction. The flat diaphragm is flexible and allows an axial movement of the valve tappet. If the pressure in the second pressure chamber is greater than the supply pressure in the third pressure chamber, an axial movement of the flat diaphragm together with the circular opening occurs along the valve tappet, so that the sealing effect of the flat diaphragm is negated and the compressed air flows out of the second pressure chamber into the third pressure chamber.

The flat diaphragm may bear axially on an end face of a second piston connected to the valve tappet. The sealing occurs at this end face. It is furthermore advantageous for sealing faces to be formed at multiple points on the second piston, to increase the working reliability.

The flat diaphragm, therefore, likewise may bear on a radial circumferential surface of the valve tappet. This constitutes a further sealing point.

In addition the valve tappet may comprise an axially varying longitudinal section on a portion immediately adjoining the second piston. Owing to the variable diameter of the valve tappet, the flat diaphragm undergoes a defined expansion at its circular opening, so that the expansion varies as a function of the axial position of the flat diaphragm.

According to at least one disclosed embodiment the valve tappet comprises a longitudinal section, conically tapering in a direction pointing axially away from the second piston, on a portion immediately adjoining the second piston. This conical portion of the valve tappet therefore has a larger diameter on a portion situated close to the second piston than a portion of the valve tappet axially more remote from the second piston. Since the conically tapering longitudinal section runs out into a portion of constant diameter, the conically tapering longitudinal section constitutes a longitudinal section of a truncated cone.

According to a second disclosed embodiment the valve tappet comprises a longitudinal section having a concave profile on a portion immediately adjoining the second piston. When the supply pressure is reduced or withdrawn, the flat diaphragm can continue, despite the piston movement, to provide a seal on the longitudinal section having a concave profile, so that a greater pressure differential is maintained between the second pressure chamber and the supply pressure, until such time as a specific pressure limit is reached or until venting occurs. A delayed venting of the brake pressure may be used if the brake pressure functions as parking brake pressure and the parking brake can only be released when an air supply reservoir has been completely vented. The maximum brake pressure set may also be maintained even if the supply pressure should fall due to pressure fluctuations, since the brake pressure does not immediately react accordingly.

According to a third disclosed embodiment the valve tappet comprises a longitudinal section having a convex profile on a portion immediately adjoining the second piston. When the supply pressure is reduced to less than the pressure value set by a spring element, the flat diaphragm is able to react immediately to the longitudinal section having a convex profile, so that the pressure in the second pressure chamber and the brake pressure assume the value of the supply pressure. The maximum brake pressure can therefore be pneumatically reduced via the supply pressure irrespective of the set maximum value of the brake pressure. In addition on venting of the supply pressure an immediate venting of the brake pressure is possible without delay.

The flat diaphragm may be produced from a cold-resistant elastomer material. The cold-resistant elastomer material may be a nitrile-butadiene rubber. The particular advantage is that owing to the conformability and elasticity of the cold-resistant elastomer material the flat diaphragm reliably ensures the sealing and check function under any conditions.

It is further proposed that a pneumatic control valve for brake control systems for rail vehicles should comprise the pneumatic pressure-regulating valve. The brake pressure can therefore be rendered independent of a feed or supply pressure, the pneumatic pressure-regulating valve providing an integrated check function of the pneumatic control valve.

FIG. 1 shows a simplified block diagram of a brake control system for rail vehicles. A control valve 21 is arranged on a main air line HL extending through the entire train. An air supply reservoir 22, which generates a supply pressure R emptying into the control valve 21 and which can be vented by a tap 23, is arranged on the control valve 21. The control valve 21 controls the filling of the air supply reservoir 22. A pneumatic pressure-regulating valve 1 is integrated in the control valve 21. The brake pressure C empties into a brake cylinder 24, which converts the pressure into a force for a friction brake, not shown here. The pneumatic pressure-regulating valve 1 serves for limiting the pressure for the brake cylinder 24 subjected to the brake pressure C. When the tap 23 is opened and the air supply reservoir 22 is therefore vented, the brake pressure line C is likewise also vented via the check valve function in the pneumatic pressure-regulating valve 1.

Figure 2:
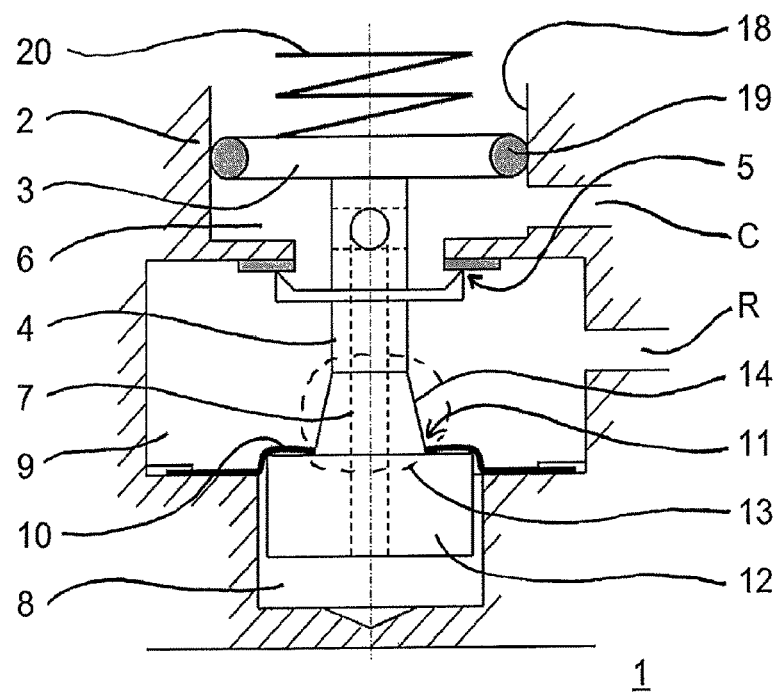
FIG. 2 shows a schematic longitudinal section of the pneumatic pressure-regulating valve of FIG. 1, having a valve tappet which, in part, comprises a conically tapering longitudinal section.

According to FIG. 2, the pneumatic pressure-regulating valve 1 comprises three pressure chambers admitting compressed air and formed in a housing 2 of the pressure-regulating valve 1. A first pressure chamber 6, sealed off by a piston 3 and a valve seat 5 arranged on a valve tappet 4, has a brake pressure C admitted to it. The piston 3 is axially moveable up and down in a cylinder 18 formed in the housing 2, and comprises a sealing element 19 on an outer circumferential surface. The sealing element seals off an upper volumetric space of the cylinder 18 from a lower volumetric space of the cylinder 18. A spring element 20, which is biased and acts with a spring force on the piston and the valve tappet connected thereto, is arranged in the upper volumetric space axially on an end face of the piston 3.

To relieve pressure, a second chamber 8 is connected to the first pressure chamber 6 by way of a passage 7 in the valve tappet 4 running along the valve tappet 4. A third pressure chamber 9, to which a supply pressure R is admitted, is arranged between the two pressure chambers 6 and 8. The sealing between the third pressure chamber 9 and the second pressure chamber 8 is provided by means of a flat diaphragm 10, which is arranged in the third pressure chamber 9 and which allows an axial movement of the valve tappet 4. The flat diaphragm 10 comprises a centrally arranged circular opening 11 for achieving a check function, through which the valve tappet 4 extends in an axial direction. The flat diaphragm 10 bears axially on an end face of a second piston 12 connected to the valve tappet 4

If the pressure in the second pressure chamber 8 is greater than the supply pressure R in the third pressure chamber 9, the circular opening 11 in the flat diaphragm 10 moves out of the conically tapering longitudinal section 14, so that the sealing effect of the flat diaphragm 10 is lost and the compressed air flows along the conically tapering longitudinal section 14 out of the second pressure chamber 8 into the third pressure chamber 9. Due to the passage 7 the pressure in the first pressure chamber 6 also falls, disturbing the equilibrium of forces on the piston 3. The valve seat 5 therefore opens and consequently successively vents the third pressure chamber 9.

Figure 3:
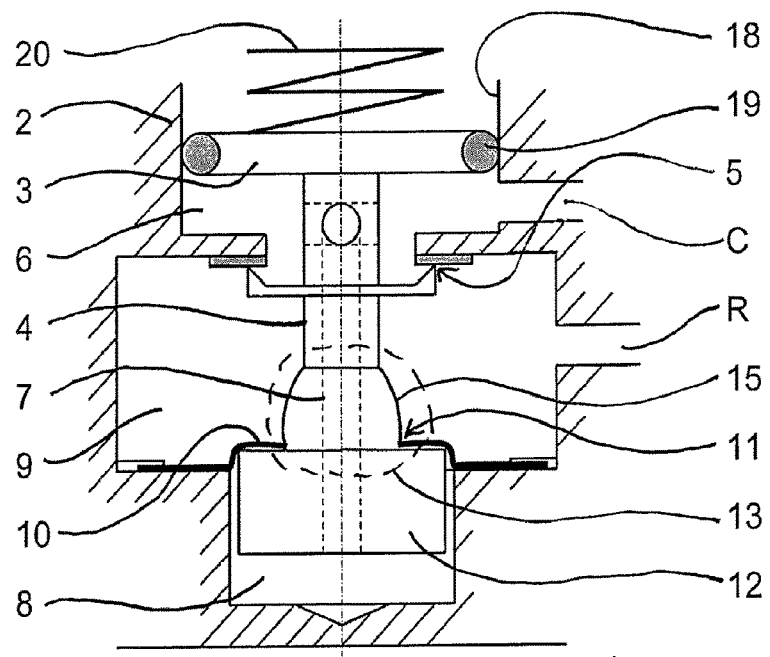
FIG. 3 shows a second exemplary embodiment of the pneumatic pressure-regulating valve having a valve tappet which, in part, comprises a longitudinal section having a convex profile.

FIG. 3 shows a further disclosed embodiment of the pneumatic pressure-regulating valve 1 in FIG. 2, the valve tappet 4 here in part comprising a longitudinal section 16 having a convex profile. When the supply pressure R is reduced to less than pressure value set by the spring element 20 the flat diaphragm 10 is able to react immediately to the longitudinal section 16 having a convex profile, so that the pressure in the second pressure chamber 8 and the brake pressure C assume the value of the supply pressure R.

Figure 4:
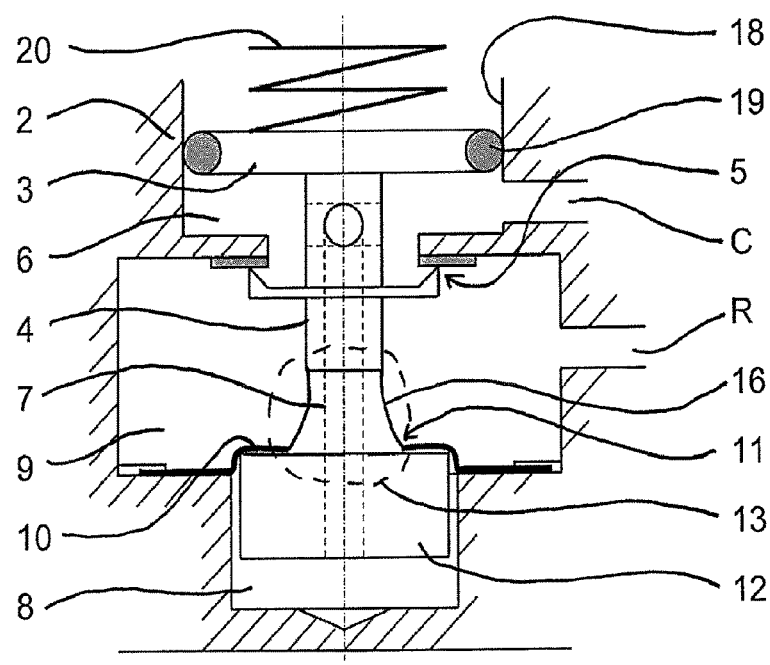
FIG. 4 shows a third exemplary embodiment of the pneumatic pressure-regulating valve having a valve tappet which, in part, comprises a longitudinal section having a concave profile.

FIG. 4 shows a further disclosed embodiment of the pneumatic pressure-regulating valve 1 in FIG. 2, the valve tappet 4 in this case in part comprising a longitudinal section 15 having a concave profile. When the supply pressure R is reduced or withdrawn the flat diaphragm 10 can continue, despite the piston movement, to provide a seal on the longitudinal section 15 having a concave profile, so that a greater pressure differential is maintained between the second pressure chamber 8 and the supply pressure R, until such time as a pressure balance or venting occurs from a specific pressure limit onwards.

It must be pointed out that "comprising" does not exclude any other elements or steps and "a" or "an" does not exclude a plurality. It must be further pointed out that the features or steps that have been described with reference to one of the exemplary embodiments above may also be used in combination with other features or steps of other exemplary embodiments described above. Reference numerals in the claims are not to be regarded as restrictive.

The generally known state of the art discloses the use of pneumatic pressure-regulating valves as maximum pressure limiters or pressure-reducing valves in pneumatic control valves, maximum pressure limiters, as distinct from pressure-reducing valves, not having any secondary pressure venting. Pressure compensation between two pressure chambers by means of axially dynamic sealing elements or a diaphragm is also known. Providing a check valve function by means of separate elements, optionally elastomer molded parts, for example, is likewise known.

The printed publication AT 326 727 B shows a pressure-regulating valve for load-dependent brake force regulators of rail vehicle brakes, which is arranged in series with the vehicle suspension and which regulates a control pressure proportional to the load of the vehicle. The pressure-regulating valve comprises a pressure-measuring plate formed from elastically or plastically deformable materials and loaded by the vehicle weight or a partial weight of the vehicle, or a pressure load cell filled with hydraulic fluid and a pressure-regulating valve comprising an inlet valve and an outlet valve and serving to regulate the control pressure. The pressure-regulating valve further comprises a diaphragm piston actuating the pressure-regulating valve, the piston being acted upon by the control pressure in the opening direction of the outlet valve part and also being braced against the pressure measuring plate or the pressure load cell by a tappet or a differential piston part having a smaller area than the diaphragm piston. For the inlet and outlet valve part the pressure-regulating valve comprises two concentric valve seats interacting with spring-loaded, elastic valve seals. The inner of a tappet displaceably supported in a sleeve is formed at one end. At its other end the tappet is coupled without any play to the diaphragm piston. The elasticity of the material of the valve seals and the force of the load spring of these valve seals are matched to one another in such a way that, with the valve closed, loaded and under the force of the valve spring, each valve seat presses into the valve seal by approximately 10% of the maximum valve travel of the tappet.

In addition, the printed publication DE 10 2011 087 511 A1 sets forth a pressure-regulating valve comprising a supply connection at which a supply pressure prevails, a tank connection at which a tank pressure prevails, and a working connection at which a working pressure prevails. The working pressure is regulated by the pressure valve, which is divided into two valve parts. In a closed position a closing piston, mechanically actuated by an actuating piston, tightly closes a connection between the supply connection and the working connection.

List of Reference Numerals 1 pneumatic pressure-regulating valve
2 housing
3 piston
4 valve tappet
5 valve seat
6 first pressure chamber
7 passage
8 second pressure chamber
9 third pressure chamber
10 flat diaphragm
11 circular opening
12 second piston
13 portion
14 conically tapering longitudinal section
15 longitudinal section having a concave profile
16 longitudinal section having a convex profile
17 pneumatic control valve
18 cylinder
19 sealing element
20 spring element
21 control valve
22 air supply reservoir
23 tap
24 brake cylinder
C brake pressure
HL main air line
R supply pressure

The invention claimed is:

1. A pneumatic pressure-regulating valve for a brake control system of a rail vehicle, the pneumatic pressure-regulating valve comprising:
at least three pressure chambers admitting compressed air and formed in a housing of the pressure-regulating valve,
wherein a first pressure chamber, sealed off by a piston and a valve seat arranged on a valve tappet, has a brake pressure admitted to it and has a fluid connection by way of a passage in the valve tappet to a second pressure chamber to relieve pressure,
wherein a third pressure chamber to which a supply pressure is admitted is furthermore arranged between the two pressure chambers and a sealing between the third pressure chamber and the second pressure chamber is provided by a flat diaphragm arranged in the third pressure chamber and which allows an axial movement of the valve tappet,
wherein the flat diaphragm comprises a centrally arranged circular opening for achieving a check function, wherein the valve tappet extends fully through the flat diaphragm in an axial direction, and
wherein, in response to pressure in the second chamber being greater than a supply pressure in the third chamber, the flat diaphragm circular opening moves relative the valve tappet so that the sealing between the second pressure chamber and the third pressure chamber is lost.

2. The pressure-regulating valve of claim 1, wherein the flat diaphragm bears axially on an end face of a second piston connected to the valve tappet.

3. The pressure-regulating valve of claim 1, wherein the flat diaphragm bears on a radial circumferential surface of the valve tappet.

4. The pressure-regulating valve of claim 2, wherein the valve tappet comprises an axially varying longitudinal section on a portion immediately adjoining the second piston.

5. The pressure-regulating valve of claim 2, wherein the valve tappet comprises a longitudinal section, conically tapering in a direction pointing axially away from the second piston, on a portion immediately adjoining the second piston.

6. The pressure-regulating valve of claim 2, wherein the valve tappet comprises a longitudinal section having a concave profile on a portion immediately adjoining the second piston.

7. The pressure-regulating valve of claim 2, wherein the valve tappet comprises a longitudinal section having a convex profile on a portion immediately adjoining the second piston.

8. The pressure-regulating valve of claim 1, wherein the flat diaphragm is produced from a cold-resistant elastomer material.

9. A pneumatic control valve for brake control systems for rail vehicles, the pneumatic control valve comprising:
a pneumatic pressure-regulating valve having at least three pressure chambers admitting compressed air and formed in a housing of the pressure-regulating valve,
wherein a first pressure chamber, sealed off by a piston and a valve seat arranged on a valve tappet, has a brake pressure admitted to it and has a fluid connection by way of a passage in the valve tappet to a second pressure chamber to relieve pressure,
wherein a third pressure chamber to which a supply pressure is admitted is furthermore arranged between the two pressure chambers and a sealing preventing air flow between the third pressure chamber and the second pressure chamber is provided by a flat diaphragm arranged in the third pressure chamber and which allows an axial movement of the valve tappet,
wherein the flat diaphragm comprises a centrally arranged circular opening for achieving a check function, wherein the valve tappet extends fully through the flat diaphragm in an axial direction, and
wherein, in response to pressure in the second chamber being greater than a supply pressure in the third chamber, the flat diaphragm moves so that the sealing between the second pressure chamber and the third pressure chamber is lost.

10. The pressure-regulating valve of claim 1, wherein the flat diaphragm undergoes a defined expansion of its circular opening as a function of the axial position of the flat diaphragm.

11. The pneumatic control valve of claim 9, wherein the flat diaphragm undergoes a defined expansion of its circular opening as a function of the axial position of the flat diaphragm.

12. The pressure-regulating valve of claim 1, wherein when the sealing of the flat diaphragm is lost, the compressed air flows between an exterior surface of the valve tappet and the opening of the flat diaphragm into the third pressure chamber.

13. The pneumatic control valve of claim 9, wherein when the sealing of the flat diaphragm is lost, the compressed air flows between an exterior surface of the valve tappet and the circular opening of the flat diaphragm into the third pressure chamber.

14. The pneumatic control valve of claim 9, wherein the flat diaphragm bears axially on an end face of a second piston connected to the valve tappet.

15. The pneumatic control valve of claim 9, wherein the flat diaphragm bears on a radial circumferential surface of the valve tappet.

* * * * *